July 12, 1955 E. F. PAWSAT ET AL 2,712,947
BICYCLE STABILIZERS
Filed Nov. 8, 1952
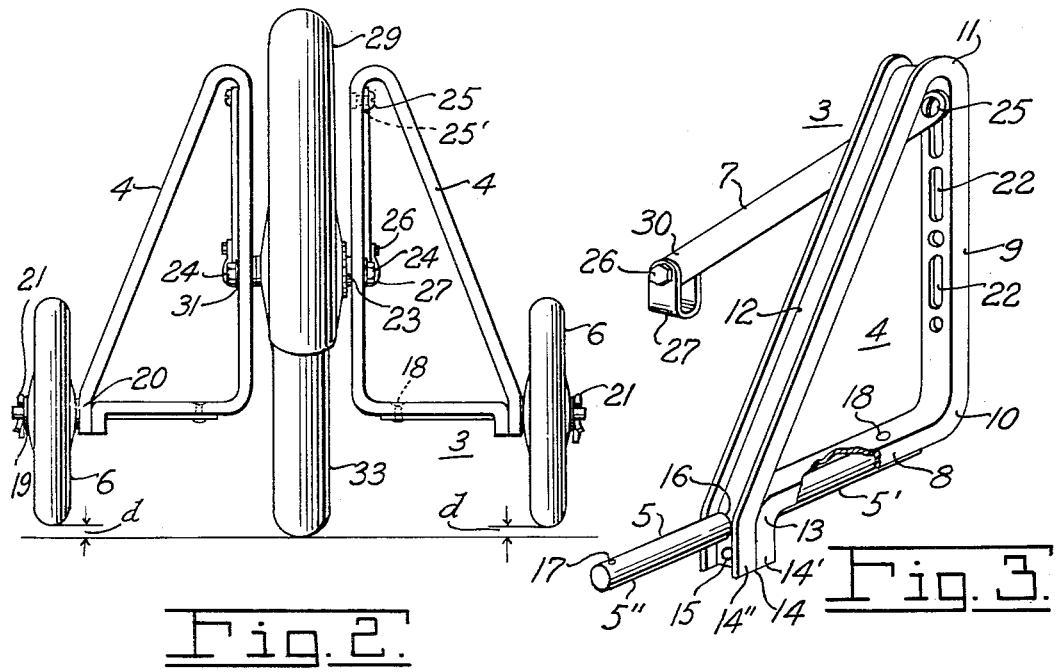
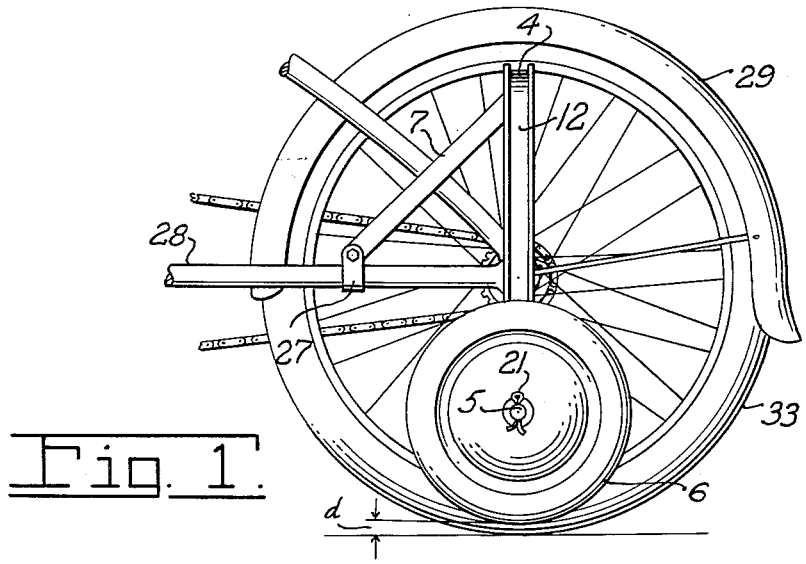
INVENTOR.
EWALD F. PAWSAT
BY RUBEN L. PAWSAT
Zugelter & Zugelter
Attys.

United States Patent Office 2,712,947
Patented July 12, 1955

2,712,947
BICYCLE STABILIZERS

Ewald F. Pawsat and Ruben L. Pawsat, Maysville, Ky.

Application November 8, 1952, Serial No. 319,474

2 Claims. (Cl. 280—293)

This invention relates to bicycle accessories and more particularly to stabilizer-stirrups.

An object of this invention is to provide a bicycle accessory for stabilizing a bicycle used by student riders.

Another object of this invention is to provide a device of the above described character, which is of simple, sturdy, novel construction adapted for easy installation upon bicycles.

Another object of this invention is to provide a device of the above described character, which is inexpensive and may be easily mounted and adjusted upon a bicycle.

A further object of this invention is to provide a device of the above described character, which is adapted to co-operate with many different sizes of bicycles in order that a dealer in such devices need only stock a single size thereof.

A further object of this invention is to provide a device of the above described character, which is also adapted for use as stirrups upon which an additional passenger may ride, thereby extending the useful life of the device.

Other objects of the invention will be apparent to those skilled in this particular art from the following description taken in conjunction with the accompanying drawings in which:

Figure 1 is a side view in elevation of the rear portion of a bicycle to which an accessory embodying the invention is attached.

Fig. 2 is a view in rear elevation of the bicycle and accessory shown in Fig. 1; and Fig. 3 is a view in perspective of a bicycle stabilizer partially broken away and with the wheel removed.

In the drawing the frame 4, of a stabilizer unit 3 embodying the invention, is shown most clearly in Fig. 3. Frame 4 may be fabricated from a single piece of elongated metal such as metal channel as shown. This metal channel is bent to form a substantially right triangular frame member 4 having a base leg 8 which is joined to an altitude leg 9 by a bend 10. Altitude leg 9 is joined by a bend 11 at its upper end to an hypotenuse leg 12 which extends to the end 13 of base leg 8 remote from bend 10. A lug 14' integral with end 13 extends substantially at a right angle to leg 8 and exteriorly of frame 4. Hypotenuse 12 is provided with an extension lug 14" which is adapted to lie in face-to-face contact with lug 14'. Lugs 14' and 14" are secured to each other in face-to-face contact by means such as a rivet 15 to form an exterior arm or composite lug 14. An aperture 16 is provided in lug 14 tangent to the center line of the outer face of base leg 8 adapted to receive an axle 5. Axle 5 is inserted through aperture 16 with a portion 5' thereof lying in contact with the exterior face of base leg 8. Means such as a rivet 18 is provided to secure axle 5 in firm and fixed contact with the face of base leg 8. Axle 5 extends substantially under the full length of base leg 8 and serves to reinforce leg 8. Axle 5 fits snugly in aperture 16 and is therefore rigidly secured to frame 4 with section 5" thereof projecting exteriorly of frame 4. Adjacent the end of axle 5 remote from frame 4 a diametral bore 17 is provided, adapted to receive a cotter pin 21 (shown in Figs. 1 and 2). A wheel 6, such as shown in Figs. 1 and 2, may be mounted on section 5". If desired, washers 19 and 20 may be provided laterally of wheel 5 upon axle portion 5" and the washers and wheel are retained thereon by means such as the cotter pin 21 received in bore 17. To adapt frame 4 for mounting upon a bicycle, apertures such as slots 22, may be provided in altitude leg 9 for receiving the end portion of a bicycle axle.

As shown in Fig. 3, a plurality of slots 22 may be provided in altitude leg 9 to adapt the unit 3 for mounting upon bicycles having wheels of various diameters. Slots 22 are of sufficient length to permit adequate vertical adjustment of the position of the unit 3 relative to a bicycle. Frame 4 is preferably mounted upon a bicycle with altitude leg 9 anchored in substantially vertical position and precluded from rotation about the bicycle axle by a brace 7. Means such as screw bolt 25, which passes through an aperture 25' in altitude leg 9, may be used to attach brace 7 adjacent one of its ends to altitude leg 9 at a point spaced a suitable radial distance from the axle of the bicycle upon which frame 4 is mounted. Brace 7 at its other end is joined by means such as screw bolt 26 to U-strap 27 which may be firmly clamped to a portion of the frame 28 of the bicycle 29, anchoring end 30 of brace 7. As shown in Figs. 1 and 2, the axle 23 of bicycle 29 may be inserted through a slot 22 and a washer 31. A nut 24 is threadedly engaged on axle 23 and may be tightened to clamp frame 4 to the bicycle. Axle 5 projects parallel to the axle 23 of bicycle 29.

The position of frame 4 may be adjusted by loosening nut 24, sliding frame 4 to the desired position and tightening nut 24. Screw bolt 26 may be loosened and U-strap 27 shifted to adjust vertical alignment of leg 4 when desired.

In use, the wheels 5 may be so positioned as to be spaced clear of the ground or pavement a distance $d$. Initially, distance $d$ may be $\frac{1}{4}''$ to $\frac{1}{2}''$ when the bicycle wheel 33 is vertical. This will allow limited tipping of the bicycle. As the rider being trained becomes more skillful in balancing on the bicycle and gains confidence, the distance $d$ may be increased by adjusting the units 3 as described above.

When the rider has been trained, he no longer needs the assistance afforded by the stabilizer as such. However, the stabilizer-stirrup accessory may continue to serve as stirrups in which a passenger may stand while riding in a position in which the passenger does not interfere with the operating rider's handling of the bicycle.

Having described the invention, it will be apparent to those skilled in the art that various modifications and changes may be made in the illustrated embodiment without departing from the spirit or the scope of the appended claims.

Therefore what is claimed as new and desired to be secured by Letters Patent is:

1. For a rider balanced vehicle, an accessory comprising a one-piece substantially right triangular frame having an hypotenuse portion and two leg portions, said hypotenuse portion and one of said legs at adjacent ends thereof being provided with co-extending portions in face-to-face contact co-operating to form an exterior arm extending parallel to the second leg, means securely joining the portions comprising said arm adjacent the free end thereof, a stub axle, means for securing said axle to said first leg at a point spaced from said arm, an aperture in said arm, said aperture being exteriorly tangent to said first leg and snugly receiving said axle intermediate the ends thereof with a portion of the axle extending in parallel contact with the first leg and co-operating with said axle securing means and a second portion of said axle extending oppositely from said arm for receiving a wheel, a wheel mounted on said wheel-receiving portion of said axle, at least one elongate aperture in said second leg, whereby said frame is adapted for mounting upon an axle of a vehicle with the stub axle thereon parallel to and spaced from said vehicle axle, a brace, means for securing said brace adjacent one end thereof to said second leg at a point spaced from said vehicle axle, and means for securing the brace adjacent the other end thereof to a portion of said vehicle spaced from the axle thereof.

2. An accessory according to claim 1, characterized by the fact that said frame is formed from a single piece of channel-shaped stock with the flanges thereof projecting outwardly, that said exterior arm is H-shaped in section, that said arm aperture is exteriorly tangent to the web of said first leg, and that a portion of said stub axle lies in parallel contact with the exterior face of the web of said first leg and between the outwardly extending flanges thereof.

References Cited in the file of this patent

UNITED STATES PATENTS

| | | |
|---|---|---|
| 1,315,048 | Stark | Sept. 2, 1919 |
| 1,657,529 | Erni | Jan. 31, 1928 |
| 2,601,994 | Richman | July 1, 1952 |
| 2,612,388 | McNeill et al. | Sept. 30, 1952 |

FOREIGN PATENTS

| | | |
|---|---|---|
| 2,432 | Great Britain | of 1896 |
| 585,036 | France | Dec. 2, 1924 |